Nov. 25, 1952
A. CHAPPUIS
2,619,299
DEVICE FOR ANCHORING RIBBONS TO HUBS
Filed Dec. 23, 1949
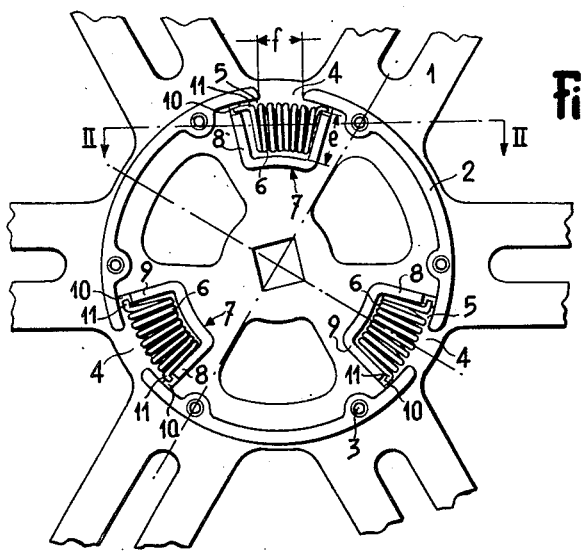
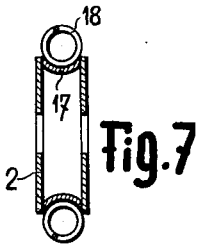
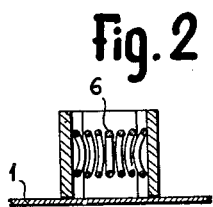
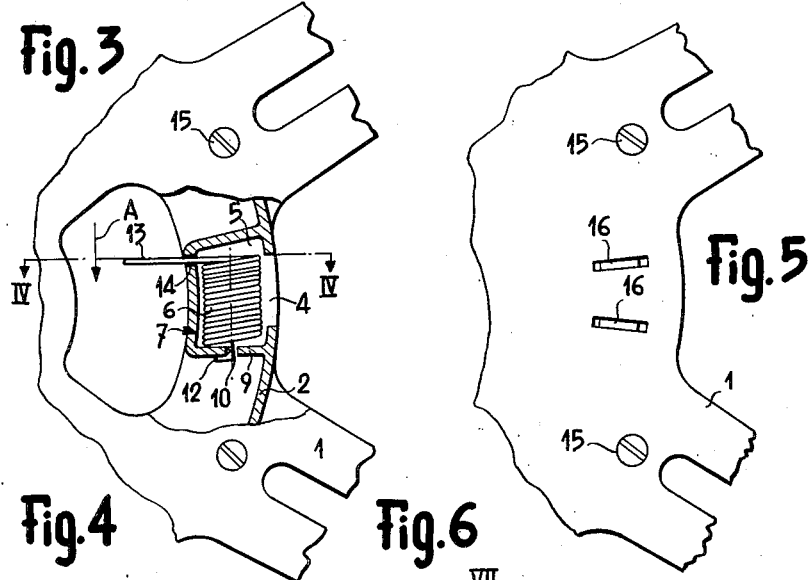
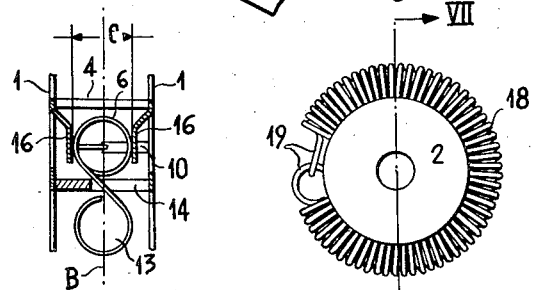
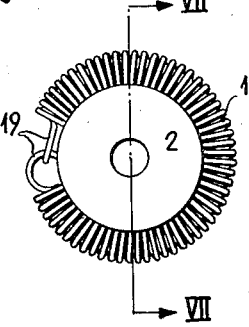
INVENTOR
Ali Chappuis.
BY
ATTORNEY Patented Nov. 25, 1952

2,619,299

UNITED STATES PATENT OFFICE 2,619,299

DEVICE FOR ANCHORING RIBBONS TO HUBS

Ali Chappuis, Yverdon, Switzerland, assignor to Paillard S. A., Sainte-Croix, Vaud, a corporation of Switzerland Application December 23, 1949, Serial No. 134,688
In Switzerland February 8, 1949

8 Claims. (Cl. 242—74)

Devices heretofore used for anchoring the end of a motion picture film to the hub of the spool or reel, present a number of disadvantages such as (1) insecurity of anchoring the end of the film where the reel is provided with a hollow hub having a slit which is difficult to make and also to locate, and into which slit the end of the film strip is inserted so that a simple pull on the film is likely to disengage the end from the slit; (2) deterioration or damage to the film where the anchoring devices are provided with points adapted to penetrate the film or enter perforations therein, or in which the film end is folded, both cases resulting in tearing the end of the ribbon anchored to the spool; (3) the necessity of providing considerable length of film for anchoring as obtained by at least one turn of the film about the hub of the reel; (4) the impossibility of using the same anchoring device for different widths and/or thicknesses of film, taking into account the capacities of different reels or spools.

The present invention has for its subject a device for anchoring a ribbon to a hub, which is distinguished from known devices by the fact that it is provided with at least one spring comprising a number of turns, secured to the hub along a plane approximately perpendicular to the axis of the hub and by the fact that the turns of the spring are in contact with one another along at least a portion of their length.

Three forms of construction of an anchoring device mounted on a spool for cinematographic films are shown diagrammatically and by way of example in the accompanying drawings, wherein:

Fig. 1 is a partial view in plan of a spool of which one of the side plates has been omitted and of which the hub contains three anchoring devices according to a first form of construction.

Fig. 2 is a partial view in section on the line II—II of Fig. 1.

Fig. 3 is a partial view in plan of a spool with a portion in section, provided with the device according to a second form of construction.

Fig. 4 is a partial view in section on the line IV—IV of Fig. 3.

Fig. 5 is a partial side view of the spool shown in Figs. 3 and 4.

Figs. 6 and 7 are views in profile and in section of a hub provided with a third form of construction of the anchoring device.

In the accompanying drawing will be seen the central part of a spool for a cinematographic film, provided with two plates 1 (of which only one is shown in Fig. 1) secured to the lateral faces of the hub 2.

In the form of construction shown in Fig. 1, the hub is formed by a drum. The side plates are secured to the drum by screws not shown. The drum has openings 4 provided in its periphery, parallel to its axis. The hub is also provided with spring seats or pockets 5, located opposite the said openings and each adapted to receive a spring 6 provided with a number of turns. The bottom 7 of each of these pockets is arched, whilst their two end walls 8 and 9 are each provided with a notch 10. The ends of the springs 6 are bent in the form of beaks 11 adapted to be engaged with the notches 10. In this first form of construction, the springs are wound in the form of a fan and the beaks only serve to hold the springs in position. The width $f$ of the opening or mouth of each pocket 4 is sufficient to allow a number of turns of the spring 6 to be seen.

The operation of the device described is as follows:

When the operator desires to anchor the end of a cinematographic film to the hub of the spool, it is sufficient for him to introduce this end into one of the openings 4 and to force it between any two turns of the spring 6. As this end of the film is clamped between two turns it is anchored automatically to the hub. It is to be observed that this anchoring is efficient, even when a film is pulled radially, so that it is not necessary to wind and tighten on the hub at least one turn of the film for ensuring anchoring, as is the case in the majority of known devices as actually used. Consequently, the length of ends necessary for anchoring the film to a spool provided with the device described, is shorter than that necessary for anchoring a film to a spool fitted with a known device. Further the manipulation is substantially easier and the success of the anchoring operation is easier and more certain.

As the turns exposed by the opening 4 are numerous the anchoring device is consequently provided with a number of anchoring inlets which have rounded edges when the wire of the spring is of circular cross section.

Thus the end of the film passes easily into one of the inlets, which is particularly advantageous when the operation must be carried out in more or less complete obscurity.

In the form of construction shown in Figs. 3, 4 and 5 the device is provided with a coiled spring 6 with touching turns, located in a seat or pocket 5 provided in the interior of the hub 2 and opposite an opening 4 parallel to the axis of the hub. One of the ends of the spring 6 is bent in the form of a beak 12 engaging with an opening 10, provided in the wall 9 of the seat or pocket 5.

The other end of the spring 6 forms a loop 13 extended laterally in the plane of the last turn. This end of the spring passes into an opening 14, provided in the bottom 7 of the seating 5, parallel to the axis of the hub. For positioning the spring 6, it suffices, after having secured one of the side plates 1 to the hub, to slide the spring into its seat or pocket 5, by engaging its ends in the openings 10 and 14. When the spring is in position, the second side plate 1 is secured to the hub 2 by means of a securing screw 15.

For anchoring the end of a film, the operator applies a thrust on the loop 13 in the direction of the arrow A in order to produce a spreading of the turns of the spring. He then introduces the end of the film between two turns thus spaced apart. By releasing the loop 13 he causes this end to be gripped between two turns.

In order to keep the spring 6 in position in its seating 5, the side plates 1 are provided with stamped tongues located opposite the end turns of the spring and which have rebated parts 16. After mounting the side plates on the hub, the spacing c of the said parts corresponds with the outer diameter of the spring 6. The latter is thus held automatically in a plane of symmetry B of the spool, perpendicularly to the axis of the hub 2.

In a modified form of construction, it is possible, for example, to imagine the springs not wound as a fan, but on a cylinder and provided with bent beaks like the beak 12 in Fig. 3, engaging openings 10 of a height e, selected in such a manner that the arcuated shape of the bottom 7 imparts to the spring the shape of a fan.

An operating member such as the loop 13 may be provided at each end of the spring 6. Further, this operating member may be located equally well on the outside of the spool as in the interior of its hub.

The width f of the opening 4 may be smaller than that shown in the drawing, but it is however of advantage to provide an opening of a width sufficient to give access to a number of anchoring inlets. The device described with reference to Figs. 1 to 5 is adapted to spools for cinematographic films but it will be understood that it is also directly adaptable to the anchoring of other ribbons.

According to the form of construction shown in Figs. 6 and 7 the hub 2 has a peripheral groove 17, into which is placed a spring 18. When the two end loops 19 are engaged with one another, the spring is sufficiently tensioned to oppose a sliding in the groove under the action of the tangential component of the pull applied thereto by the film. Finally, as shown in Fig. 6, the turns of the spring are slightly fan-shaped and constitute a plurality of inlets for anchoring the end of a ribbon.

In a modified form of construction the two ends of the spring 18 may be screwed one into the other, or engaged with a connecting member formed by a piece of a tore of which the surface is provided with circular grooves or a screw thread with which the turns of the spring may engage or even by any other type of known connections.

It is also possible, for example for anchoring ribbons having a large width, to provide a number of springs arranged parallel; it will be understood that the cross section of the spring may be other than circular. In fact, in some cases, for example, when the ribbon to be anchored has a predetermined width, it may be of advantage to provide the device with springs either of rectangular or elliptical cross section.

I claim:

1. In combination with the hub of a spool, an anchoring device for a ribbon, said device comprising a coiled spring having a number of turns, said spring being secured within said hub along a plane approximately perpendicular to the axis of said hub, said turns being in contact with one another over at least a portion of their length, a pair of side plates engaging one with each end of said hub, and deformations on said side plates holding said spring in position in the interior of said hub.

2. A film carrying reel comprising, in combination, a hollow hub, a pair of complementary side plates secured thereto and spaced apart axially thereby, said hub provided with a peripheral opening between said plates through which one end of a film wound thereupon may be extended into the interior of the hub, a spiral spring of arcuate shape comprising a linear succession of pairs of adjacent coils, said plates provided interiorly with complementary deformations within which the spring is seated and held to extend across said opening, said opening being of such a length that a plurality of adjacent pairs of coils of the springs are exposed thereacross.

3. A film carrying reel, comprising, side plates, a hub between said side plates, and means for securing a film end to said hub, said means including a convolute spring supported by the hub and having portions of its convolutions remote from the hub exposed for receiving a film end to yieldingly grip the same.

4. A film carrying reel, comprising, side plates, a hub between said side plates, means forming pockets in the hub having an opening at the outer face of the hub and a convolute spring anchored in each pocket and having portions of its convolutions remote from the hub exposed through the opening of a related pocket to provide multiple gripping points for selectively holding a film end inserted therein.

5. A film carrying reel, comprising, side plates, a hub between said side plates, means forming pockets in the hub, said means including bottom and end walls and a top wall having a medial opening, and a convolute spring nested within said walls and having portions of its convolutions remote from the hub exposed through said opening to provide multiple gripping points for selectively holding a film end inserted therein.

6. A film carrying reel, comprising, side plates, a hub between said side plates, means forming pockets in the hub, said means including bottom and end walls and a top wall having a medial opening, and said end walls having a notch and a convolute spring having end portions engaged in said notches, said spring also having portions of its convolutions exposed through said opening to provide multiple gripping points for selectively holding a film end inserted therein.

7. A film carrying reel, comprising, side plates, a hub between said side plates, means forming pockets in the hub, said means including bottom and end walls and a top wall having a medial opening, one of said walls having a notch and the bottom wall having a slot, and a convolute spring having one end engaging in said notch and a finger engaging lever loop extending through said slot, whereby, finger pressure applied to said loop will expand the portions of the convolutions remote from the bottom wall and exposed through said medial opening to provide multiple gripping points for selectively holding a film end inserted therein.

8. A film carrying reel, comprising, side plates, a hub between said side plates and a convolute spring surrounding the hub and having its ends secured together, the outer exposed portions of the convolutions of the spring providing multiple gripping points for selectively holding a film end inserted therein.

ALI CHAPPUIS.

REFERENCES CITED

The following references are of record in the file of this patent:

UNITED STATES PATENTS

| Number | Name | Date |
|---|---|---|
| 1,761,837 | McCarthy | June 3, 1930 |
| 2,484,100 | Kramer | Oct. 11, 1949 |

FOREIGN PATENTS

| Number | Country | Date |
|---|---|---|
| 476,785 | Great Britain | Dec. 15, 1937 |